(12) United States Patent
Zhao

(10) Patent No.: US 11,306,868 B2
(45) Date of Patent: Apr. 19, 2022

(54) CEILING BOX WITH MOUNTING BRACKET

(71) Applicant: Mingrong Zhao, Ottawa (CA)

(72) Inventor: Mingrong Zhao, Ottawa (CA)

( * ) Notice: Subject to any disclaimer, the term of this patent is extended or adjusted under 35 U.S.C. 154(b) by 229 days.

(21) Appl. No.: 16/676,464

(22) Filed: Nov. 7, 2019

(65) Prior Publication Data

US 2020/0149681 A1 May 14, 2020

Related U.S. Application Data

(60) Provisional application No. 62/757,165, filed on Nov. 8, 2018.

(51) Int. Cl.
*H02G 3/08* (2006.01)
*F16M 13/02* (2006.01)
*H02G 1/00* (2006.01)

(52) U.S. Cl.
CPC ............ *F16M 13/027* (2013.01); *H02G 1/00* (2013.01); *H02G 3/081* (2013.01)

(58) Field of Classification Search
CPC ........ E04B 9/006; F16M 13/027; H02G 1/00; H02G 3/081; H02G 3/086; H02G 3/08; H02G 3/16; H01H 9/02; H02B 1/40; Y10S 24/906

USPC ................ 174/491, 50, 503, 481, 535, 520; 248/343, 906; 220/3.92, 3.9, 3.3, 3.2, 220/4.02

See application file for complete search history.

(56) References Cited

U.S. PATENT DOCUMENTS

| | | | | |
|---|---|---|---|---|
| 904,458 A | * | 11/1908 | Scism | H02G 3/14 220/3.8 |
| 3,918,224 A | * | 11/1975 | Sundequist | H01R 25/14 174/491 |
| 5,975,323 A | * | 11/1999 | Turan | H02G 3/086 220/3.7 |
| RE38,120 E | * | 5/2003 | Bordwell | H02G 3/20 174/53 |
| 6,979,108 B1 | * | 12/2005 | Berge | F04D 25/088 362/147 |
| 8,143,520 B2 | * | 3/2012 | Cutler | H02G 3/14 174/66 |
| 9,065,264 B2 | * | 6/2015 | Cooper | H02G 3/20 |
| 9,496,699 B2 | * | 11/2016 | Kerr | H02G 3/14 |
| 2018/0331526 A1 | * | 11/2018 | Zhao | H02G 3/081 |

* cited by examiner

*Primary Examiner* — Joshua T Kennedy

(57) ABSTRACT

The present invention is regarding electrical ceiling outlet box and mounting bracket. The mounting bracket will not be placed below the ceiling box as people usually do currently. Instead, it will be placed in the ceiling box, on the top of two mounting elements (ears). Thus installer can hang the mounting bracket and attached light feature or ceiling fan on, have two hands for the installation.

8 Claims, 7 Drawing Sheets

CEILING BOX WITH MOUNTING BRACKET

BACKGROUND OF THE INVENTION

The present invention is in the technical field of electrical devices. More particularly, the present invention is in the technical field of electrical ceiling outlet box (referred to as ceiling box).

CROSS-REFERENCE TO RELATED APPLICATION

U.S. Pat. No. 6,777,615B1 Fan rated junction box assembly

BACKGROUND OF THE INVENTION

To better understand the present invention, it is necessary to describe the current problems during the installation by using a ceiling box and a mounting bracket to hold a light fixture or ceiling fan (referred to as LFOCF) up to the ceiling. The ceiling box is pre-installed in the ceiling, which has two mounting elements on its open bottom with 2 threaded holes located in the middle of two mounting elements. The mounting bracket has 2 threaded holes on each end. The mounting bracket has a hole in the middle to connect a LFOCF. The mounting bracket attached with a LFOCF is placed under the mounting elements of the ceiling box, allowing for fastening with 2 fasteners. Generally speaking, the installation includes 2 Steps:

Step 1, connecting wires. It is to connect power to a LEOCF. Step 2, Fastening mounting bracket to the mounting elements of ceiling box. During this process, people need to hold the mounting bracket up to ceiling continuously for the fastening process. Thus only one hand left free for fastening. The problems could be: 1). The LFOCF is too heavy to hold by only one hand; 2). Fastening requires two hands work together, however there is only have one hand available for it. 3). The step 2 process can not be paused or suspended. Either complete it in one shot or redo it from step 1. This cause pain if tools or screws drip off accidentally.

BRIEF SUMMARY OF THE INVENTION

The present invention solves the all 3 problems caused by Step 2. In the present invention, instead of placing a mounting bracket under mounting elements of the ceiling box, people place it on the top of the mounting elements. Thus, the mounting elements of the ceiling box can hold the mounting bracket and the weight of the LFOCF. This allows people having their both hands working on securing the LFOCF to mounting elements of the ceiling box.

The present invention not only makes installation easier but also enhances workplace safety and efficiency. People no longer needs to hold a heavy LFOCF by hand on a ladder; also less chance damage LFOCF by accidently drop off.

BRIEF DESCRIPTION OF THE DRAWINGS

The following FIGS. are focusing on the improvement of the present invention. It does not demonstrate parts or mention regular existing requirements that are not related to the present invention. It only demonstrates parts and requirements that directly related to the spirit of the present invention.

DETAILED DESCRIPTION OF THE INVENTION

Figure 1:
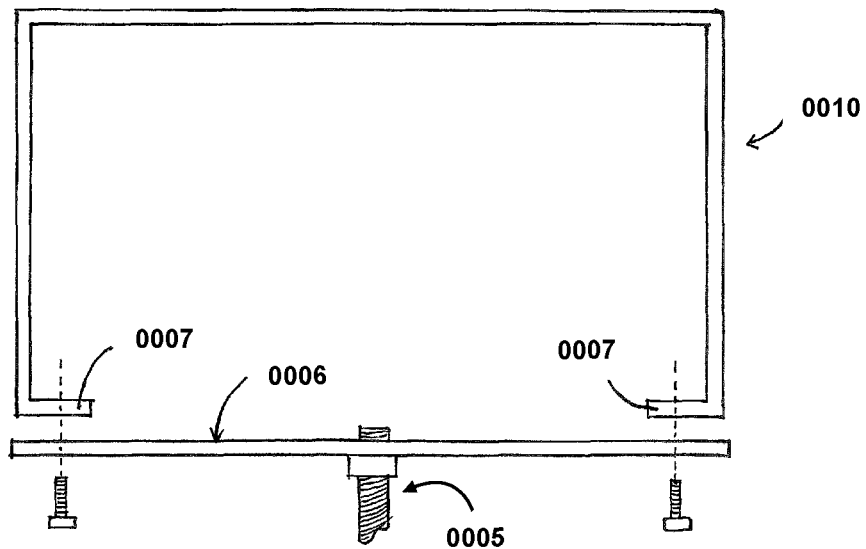
FIG. 1 is a comparative illustration for Step 2, showing the crucial difference between the current ceiling box and the present invention.
Figure 1:
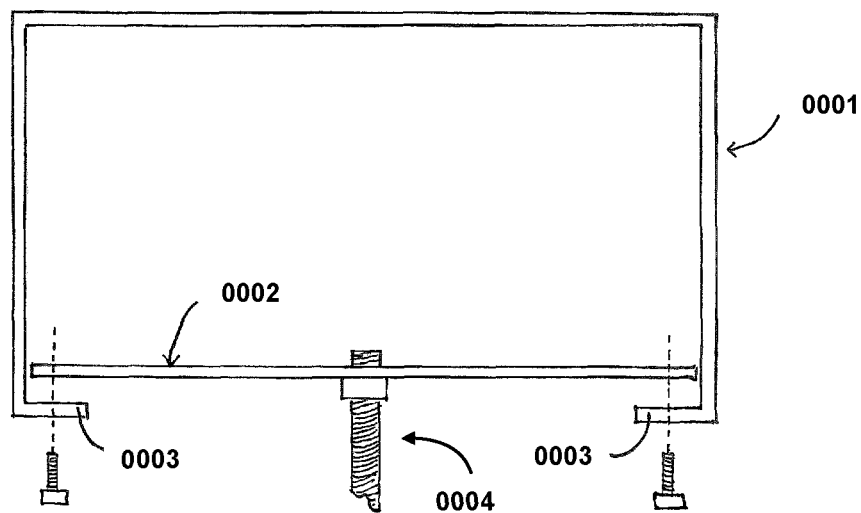

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "with," "comprising," or "having" and variations thereof herein is meant to encompass the items listed thereafter and equivalents thereof as well as additional items. Unless limited otherwise, the term "attached" and variations thereof herein are used broadly and encompass direct and indirect connections, fastening, couplings, and mountings. In addition, the term variations thereof are not restricted to physical or mechanical connections or couplings.

Refer to FIG. 1. It is a comparative illustration for Step 2, showing the crucial difference between the current ceiling box 0010 and the present invention 0001. It reveals the spirit of the present invention: Currently, people always place mounting bracket 0006 under mounting elements 0007 of ceiling box 0010 for connecting 0005 LFOCF to ceiling box 0010. In the present invention, shortened mounting bracket 0002 places on the top of mounting elements 0003 of ceiling box 0001. Thus, mounting elements 0003 of ceiling box 0001 can hold the weight of LFOCF 0004 to free people's both hands. People can use two hands to complete Step 2. Accordingly, both mounting elements 0003 of ceiling box 0001 and mounting brackets 0002 are adapted to enhance the spirit of the present invention.

The present invention also gives people freedom to pause the installation at any time. Currently, people don't have this kind of freedom. Once the power wires connected to LFOCF, they have to continue using their hands holding LFOCF until the completion of Step 2.

The following FIGS. after FIG. 1 are provided to show some of the embodiments which carry out the spirit of the present invention. The present invention should, therefore, not limited by the following described embodiments, method, and examples. But by all embodiments and methods within the scope and spirit of the present invention.

Since the spirit of the present invention only physically involves mounting elements of ceiling box and mounting bracket, the following FIGS. only show a partial view of mounting element and mounting brackets.

Figure 2:
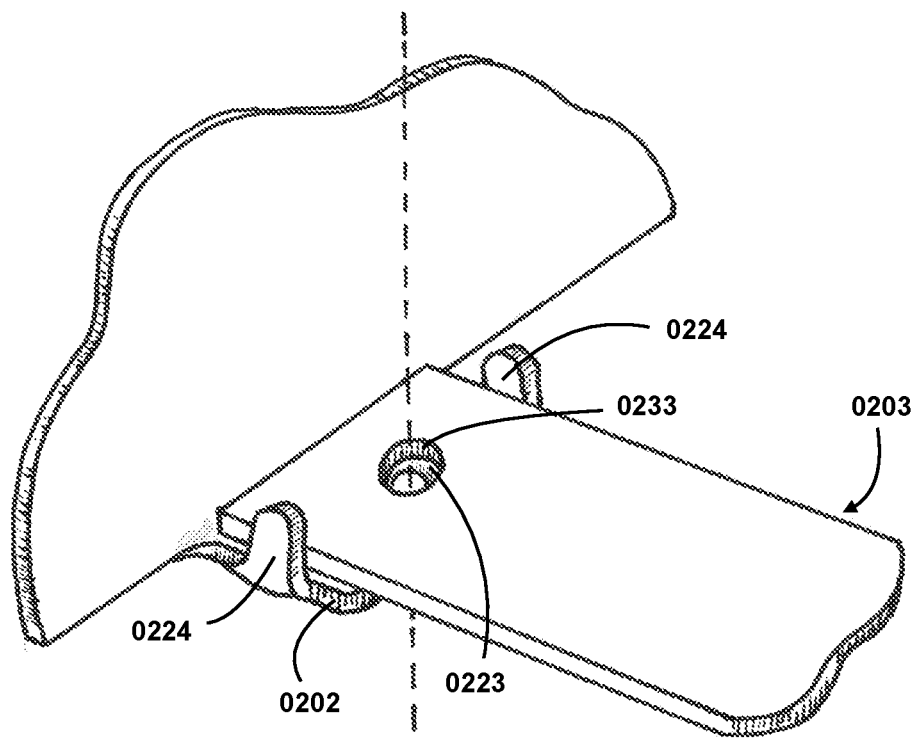
FIG. 2 is a partial view of one of the embodiments of the present invention. It shows one of mounting elements of ceiling box. The mounting element of ceiling box has 2 pins around its threaded hole. There is a mounting bracket on top of the mounting elements, also located between 2 pins.

Refer to FIG. 2. It is a partial view of one of the embodiments of the present invention. It shows one of mounting elements 0202 having 2 pins 0224 around its threaded hole 0223. The 2 pins 0224 hold a mounting bracket 0203 from slipping off. The mounting bracket 0203 has threaded hole 0233.

Figure 3:
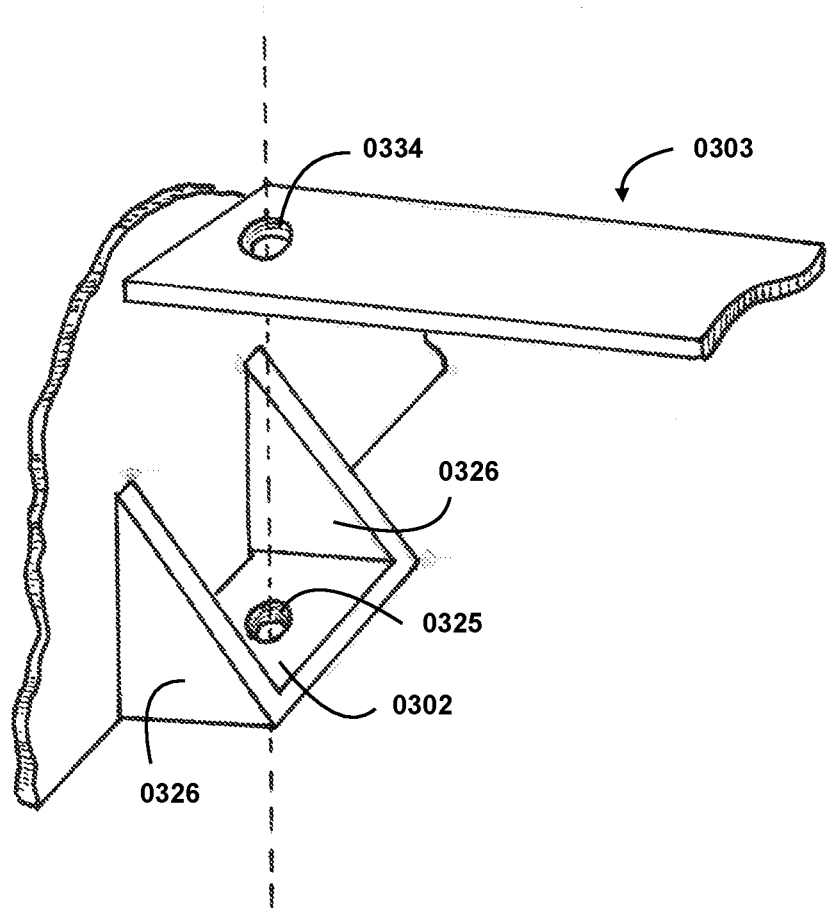
FIG. 3 is a partial view of one of the embodiments of the present invention. It shows one of mounting elements of ceiling box. The mounting element of ceiling box has two walls beside its threaded hole. There is a mounting bracket above the mounting elements.

FIG. 3 is a partial view of one of the embodiments of the present invention. It shows one of mounting elements 0302 of a ceiling box having two walls 0326 beside threaded hole 0325. The mounting bracket 0303 has a threaded hole 0334. The two walls 0326 hold the mounting bracket from slipping off, and can also make the mounting elements 0302 stronger for holding a heavy LFOCF.

Figure 4:
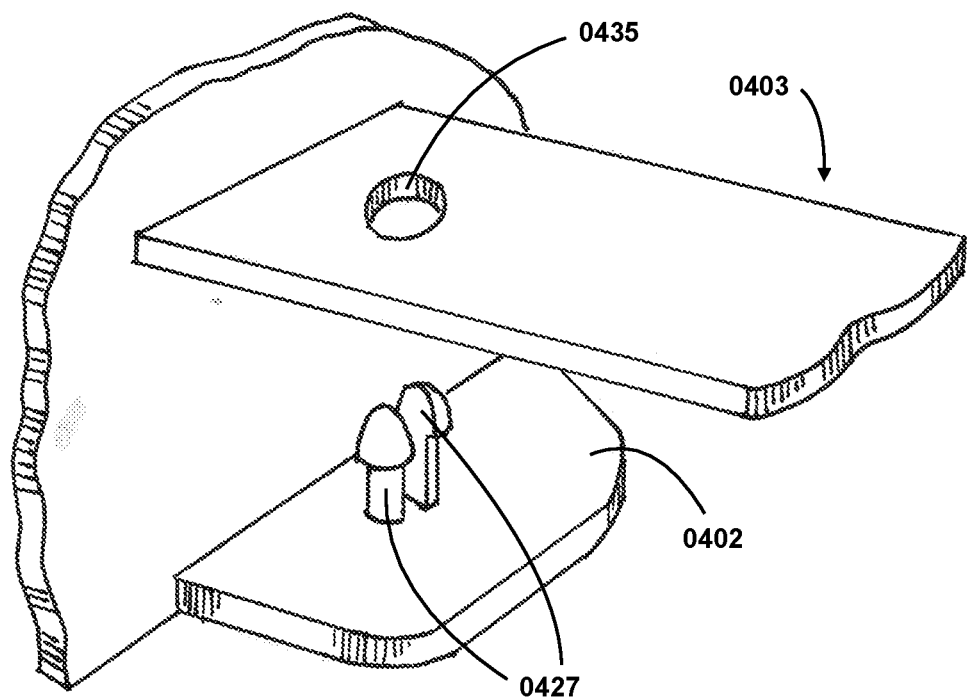
FIG. 4 is a partial view of one of the embodiments of the present invention. The threaded hole on the mounting element of ceiling box is replaced by a click-in post. There is a mounting bracket above the mounting elements.

Refer to FIG. 4. It is a partial view of one of the embodiments of the present invention. There is no threaded hole on mounting elements 0402 of ceiling box. Instead, a click-in post 0427 replaces the original threaded hole. The click-in post 0427 goes through hole 0435 of the mounting brackets 0403. The click-in post thus can catch the mounting brackets 0403 safely. Understandably, the click-in post also can locates on a mounting bracket, thus, it can click into regular hole of mounting elements of a ceiling box.

Figure 5:
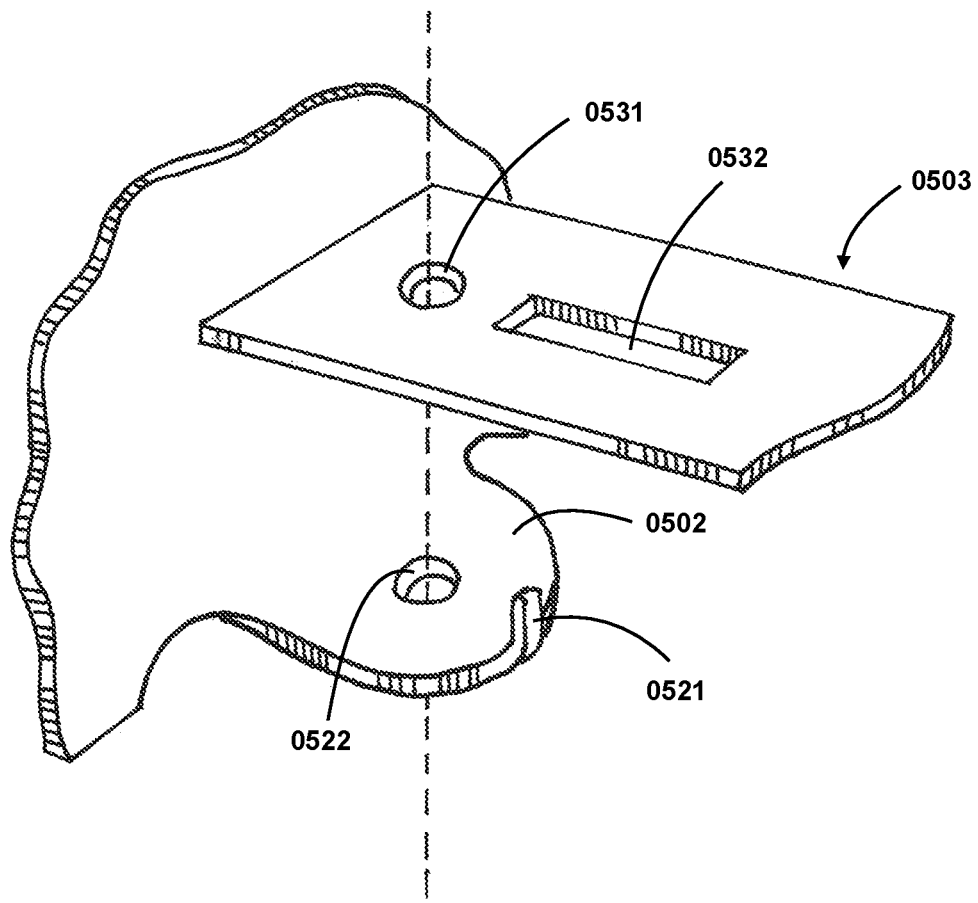
FIG. 5 is a partial view of one of the embodiments of the present invention. There is one pin beside the threaded hole on mounting element of ceiling box. There is a mounting bracket above the mounting elements.

Refer to FIG. 5. It is a partial view of one of the embodiments of the present invention. There is one pin 0521 beside a threaded hole 0522 located in a mounting element 0502 of a ceiling box. A mounting bracket 0503 having a thread hole 0531. The mounting bracket 0503 also has pre-carved hollow 0532 so that the pin 0521 can go through the hollow 0523 of mounting bracket 0503 to prevent it from slipping off. When the pin 0521 is long enough to be bent, people can directly bend the pin 0521 to catch the mounting bracket 0503. People do not need screws anymore.

Figure 6:
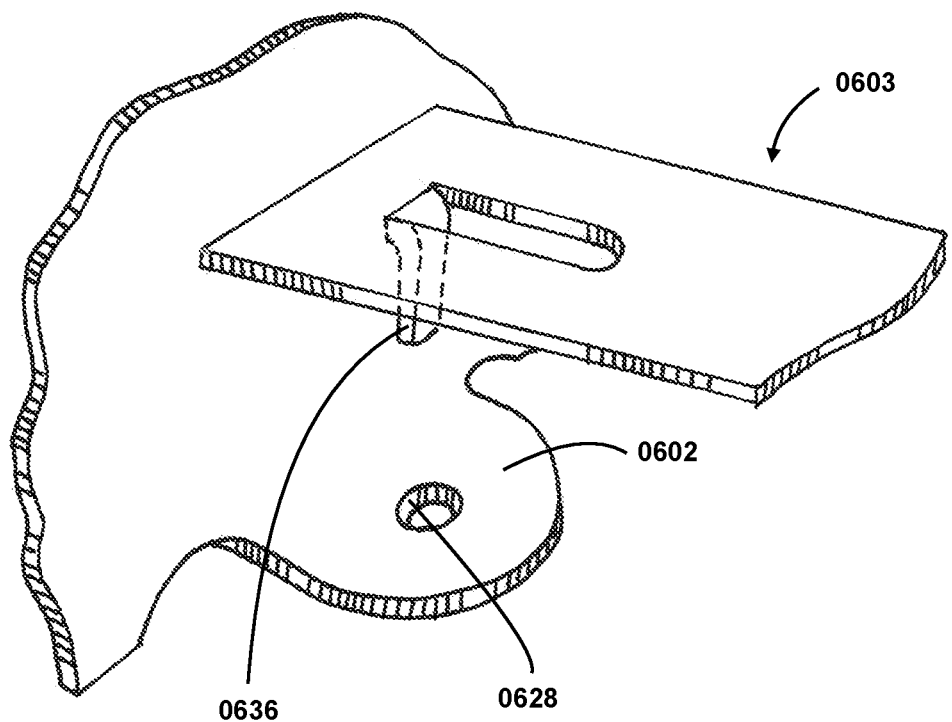
FIG. 6 is a partial view of one of the embodiments of the present invention. There is one pin on the mounting bracket. There is a mounting bracket above the mounting elements.

Refer to FIG. 6. It is a partial view of one of the embodiments of the present invention. There is a pin 0636 located on a mounting bracket 0603 to replace the original threaded hole. The pin 0636 on the mounting bracket 0603 is able to be inserted into threaded hole 0628 on a mounting elements 0602 of a ceiling box. The pin 0636 is long enough to be bent on the bottom of the mounting element 0602 of the ceiling box. Then it catches the mounting bracket 0603 firmly, thus no screws are needed.

Figure 7:
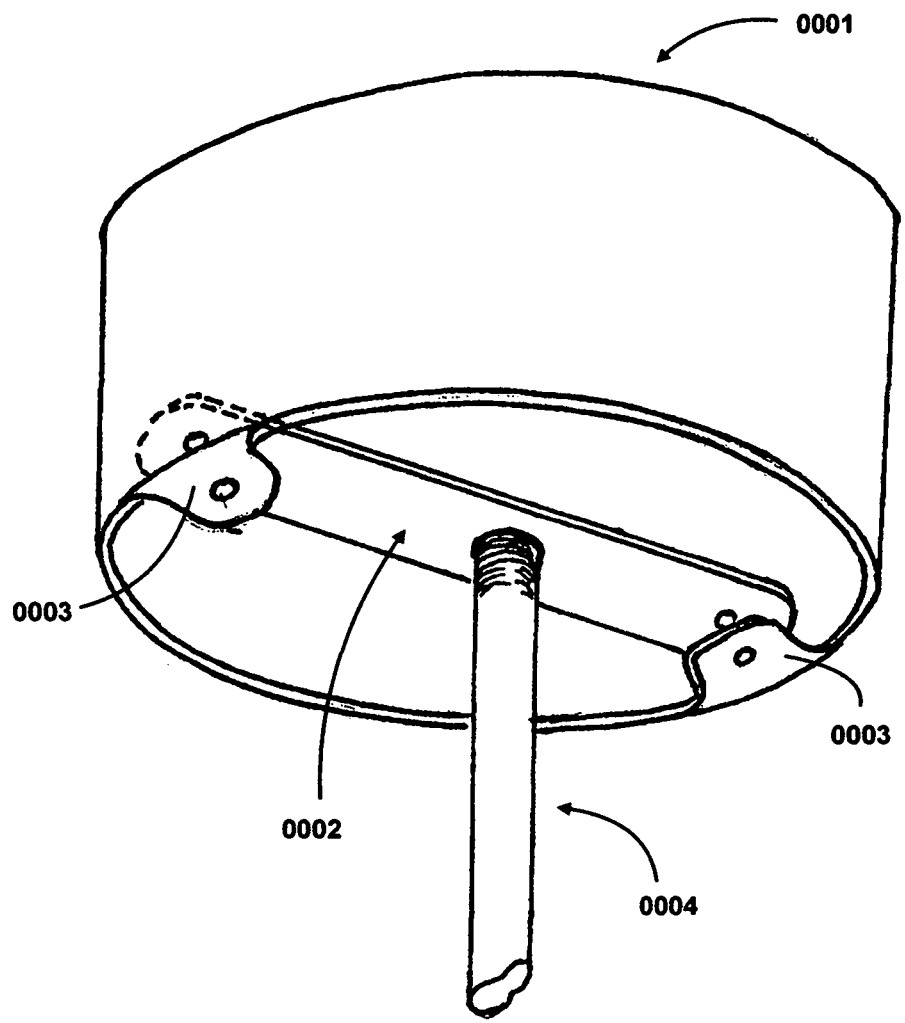

Refer to FIG. 7. It is a perspective view of 0001 in FIG. 1 to illustrate the present invention. It shows a mounting bracket 0703 is inside of a ceiling box 0701 and right on the top of two mounting elements 0702. People can use the mounting elements 0702 holding the mounting bracket 0703 attached with a LFOCF 0704. Thus people have two hands free to connect the mounting elements 0702 and the mounting bracket 0703 together.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention.

I claim:

1. An installation kit comprising:
   a ceiling box; and
   a mounting bracket comprising:
   a rectangular plate and two small threaded holes on each end of said plate, and one large threaded hole in a middle portion of the plate configured to attach to a ceiling light feature or ceiling fan;
   said ceiling box having a ceiling box body and two mounting elements unitary and one piece with said body located on or adjacent an open bottom of said box body, said mounting elements comprising a mounting feature projecting therefrom in a direction away from said open bottom;
   wherein said mounting bracket has a length of longest edges of said plate, such that the length of said mounting bracket is equal to or shorter than an inner diameter of said ceiling box, such that said mounting bracket is configured to be placed on the top of said mounting elements of said ceiling box and engaged to said mounting features to align said small threaded holes of said mounting bracket with said two threaded holes of mounting elements of said ceiling box.

2. A method of installation comprising the installation kit of claim 1, comprising the steps of:
   attaching a ceiling light feature or a ceiling fan to the middle threaded hole of said mounting bracket;
   mounting said mounting bracket on the top of said mounting elements of said ceiling box to allow said two mounting elements to hold said mounting bracket and said ceiling light feature or ceiling fan to free installer's both hands.

3. The installation kit of claim 1, wherein said mounting feature comprises two pairs of pins extending outwardly from opposing outer edges of said mounting elements of said ceiling box;
   wherein when placing said mounting bracket on the top of said mounting elements of said ceiling box, the two pairs of pins of said mounting elements of said ceiling box will hold said mounting bracket, configured to avoid said mounting bracket with attached ceiling light feature or ceiling fan slipping off said mounting elements of said electrical ceiling box accidentally.

4. The installation kit of claim 1, wherein said mounting feature comprises two pairs of walls extending from side edges of said mounting elements of said ceiling box to a respective inner wall of said ceiling box body of said ceiling box to increase holding capacity;
   wherein when placing said mounting bracket on the top of said mounting elements of said ceiling box, said two pairs of walls will hold said mounting bracket, configured to avoid said mounting bracket with attached ceiling light feature or ceiling fan slipping off said mounting elements accidentally.

5. The installation kit of claim 1 wherein said mounting feature comprises one pin on each said mounting element of said ceiling box.

6. The installation kit of claim 1, wherein said mounting bracket further comprises two slots, each said slot is located adjacent to a respective one of said small threaded holes, allowing said one pin on each said mounting element to extend through each of said slots of said mounting bracket;
   wherein said two pins of said two mounting elements of said ceiling box will extend through said respective slot of said mounting bracket to hold said mounting bracket, configured to avoid said mounting bracket with attached ceiling light feature or ceiling fan from slipping off said mounting elements.

7. An installation kit comprising:

a ceiling box; and a mounting bracket comprising:
   a rectangular plate and having two small holes on each end of said plate and one large threaded hole in a middle portion of the plate configured to attach a ceiling light feature or ceiling fans; and said ceiling box having a ceiling box body having an open bottom, and two mounting elements unitary and one piece with said body located on or adjacent said open bottom of said box body, said ceiling box mounting elements further comprising two click-in posts, one on each of said mounting elements, said click-in posts extend out towards an opposite direction of the open bottom of said ceiling box;

wherein said mounting bracket has a length of longest edges of said plate, such that the length of said mounting bracket is equal to or shorter than an inner diameter of said ceiling box, such that said mounting bracket is configured to be placed on the top of said mounting elements of said ceiling box such that said mounting elements and said mounting bracket are attached by pushing down said mounting bracket to allow said click-in posts to extend through said two respective holes of said mounting bracket.

8. An installation kit comprising:

a mounting bracket having two pins on each end and one large threaded hole in a middle portion of said mounting bracket configured to attach a ceiling light feature or ceiling fans; and a ceiling box body having an open bottom, and two mounting elements located on or near said open bottom, said mounting elements further have two respective holes on each of said mounting elements;

wherein said pins' diameter size is equal to or smaller than said two holes of said two mounting elements of said ceiling box;

wherein when attaching said mounting bracket to said ceiling box, said two pins of said mounting bracket are inserted into said respective holes in said mourning elements of said ceiling box.

* * * * *